US009739590B2

(12) United States Patent
Han

(10) Patent No.: US 9,739,590 B2
(45) Date of Patent: Aug. 22, 2017

(54) DEVICE FOR MEASURING FLATNESS OF PLATE

(71) Applicant: SAMSUNG DISPLAY CO., LTD., Yongin-si, Gyeonggi-Do (KR)

(72) Inventor: Jeong Won Han, Seongnam-si (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 145 days.

(21) Appl. No.: 14/864,928

(22) Filed: Sep. 25, 2015

(65) Prior Publication Data

US 2016/0290777 A1 Oct. 6, 2016

(30) Foreign Application Priority Data

Mar. 30, 2015 (KR) ........................ 10-2015-0044360

(51) Int. Cl.
*G01B 5/28* (2006.01)
*G01B 5/207* (2006.01)

(52) U.S. Cl.
CPC ............. *G01B 5/285* (2013.01); *G01B 5/207* (2013.01)

(58) Field of Classification Search
CPC ................................ G01B 5/285; G01B 5/207
USPC ........................... 33/533, 551, 552, 553, 554
See application file for complete search history.

(56) References Cited

U.S. PATENT DOCUMENTS 6,125,338 A * 9/2000 Brienza .................. G01B 5/207 425/4 R
6,160,264 A * 12/2000 Rebiere .................... A43D 1/02 12/1 R
8,294,758 B2 * 10/2012 Lynde ..................... E21B 31/00 33/552
2005/0022407 A1 * 2/2005 Tadin ....................... A43D 1/02 33/515
2005/0076521 A1 * 4/2005 Said ....................... G01B 5/207 33/552
2007/0056178 A1 * 3/2007 Kleyman ............... G01B 5/207 33/561.1
2015/0377601 A1 * 12/2015 Shu ........................ G01B 5/207 33/561.1

FOREIGN PATENT DOCUMENTS

KR 10-2001-0010812 A 2/2001
KR 10-2004-0087142 A 10/2004
KR 10-2011-0008612 A 1/2011
KR 10-2012-0076217 A 7/2012
KR 10-1307153 B1 9/2013
KR 10-1310336 B1 9/2013
KR 10-1352619 B1 1/2014

* cited by examiner

*Primary Examiner* — G. Bradley Bennett
(74) *Attorney, Agent, or Firm* — Lee & Morse, P.C.

(57) ABSTRACT

A plate flatness measurement device, including a support frame including a center area, the center area including a through-hole in a center of the center area, and a peripheral area surrounding the center area, the peripheral area having a plate with protrusions on a bottom surface of the plate mounted to the peripheral area; and a sensor module in the support frame, the sensor module at least partially protruding above the support frame to contact the protrusions.

11 Claims, 8 Drawing Sheets

10

10

DEVICE FOR MEASURING FLATNESS OF PLATE

CROSS-REFERENCE TO RELATED APPLICATION

Korean Patent Application No. 10-2015-0044360, filed on Mar. 30, 2015, in the Korean Intellectual Property Office, and entitled: "Device for Measuring Flatness of Plate," is incorporated by reference herein in its entirety.

BACKGROUND

1. Field

The described technology relates to a device for measuring flatness of a plate.

2. Description of the Related Art

The electronics industry, including, for example, semiconductors and displays, may be further researched and developed, and more delicate electronic goods may be manufactured. Such delicate electronic goods may be manufactured through numerous processes, e.g., in case of a thin film deposition device, a deposition process may be performed for deposition of an organic thin film and a mask and a substrate may be attached to each other air-tight for uniform deposition of an organic material pattern on the substrate during the deposition process.

SUMMARY

Embodiments may be realized by providing a plate flatness measurement device, including a support frame including a center area, the center area including a through-hole in a center of the center area, and a peripheral area surrounding the center area, the peripheral area having a plate with protrusions on a bottom surface of the plate mounted to the peripheral area; and a sensor module in the support frame, the sensor module at least partially protruding above the support frame to contact the protrusions.

Two or more sensor modules may be along a periphery of the through-hole in the center area.

A height of the center area may be lower than a height of the peripheral area.

The support frame may include an insertion groove in the center area and in which the sensor module is inserted.

Two or more insertion grooves may surround the through-hole.

The through-hole may have a quadrangular-shaped cross-section.

The sensor module may include a sensor; a first plate on which the sensor is mounted; a contact plate above the first plate, the contact plate contacting at least one protrusion; and a vertical movement member combining the first plate and the contact plate to make the contact plate vertically movable.

The sensor module may further include a second plate below the first plate; and a gap control member combining the first plate and the second plate with a controllable gap between the first plate and the second plate.

The contact plate may have a cross-section area that is greater than a cross-section area of the protrusion.

The sensor may be a displacement sensor including one or more of an optical sensor, a contact sensor, a magnetic sensor, a capacitive sensor, an eddy current sensor, or an ultrasonic wave sensor.

Two or more sensor modules may correspond to each other at opposite locations with reference to the through-hole.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
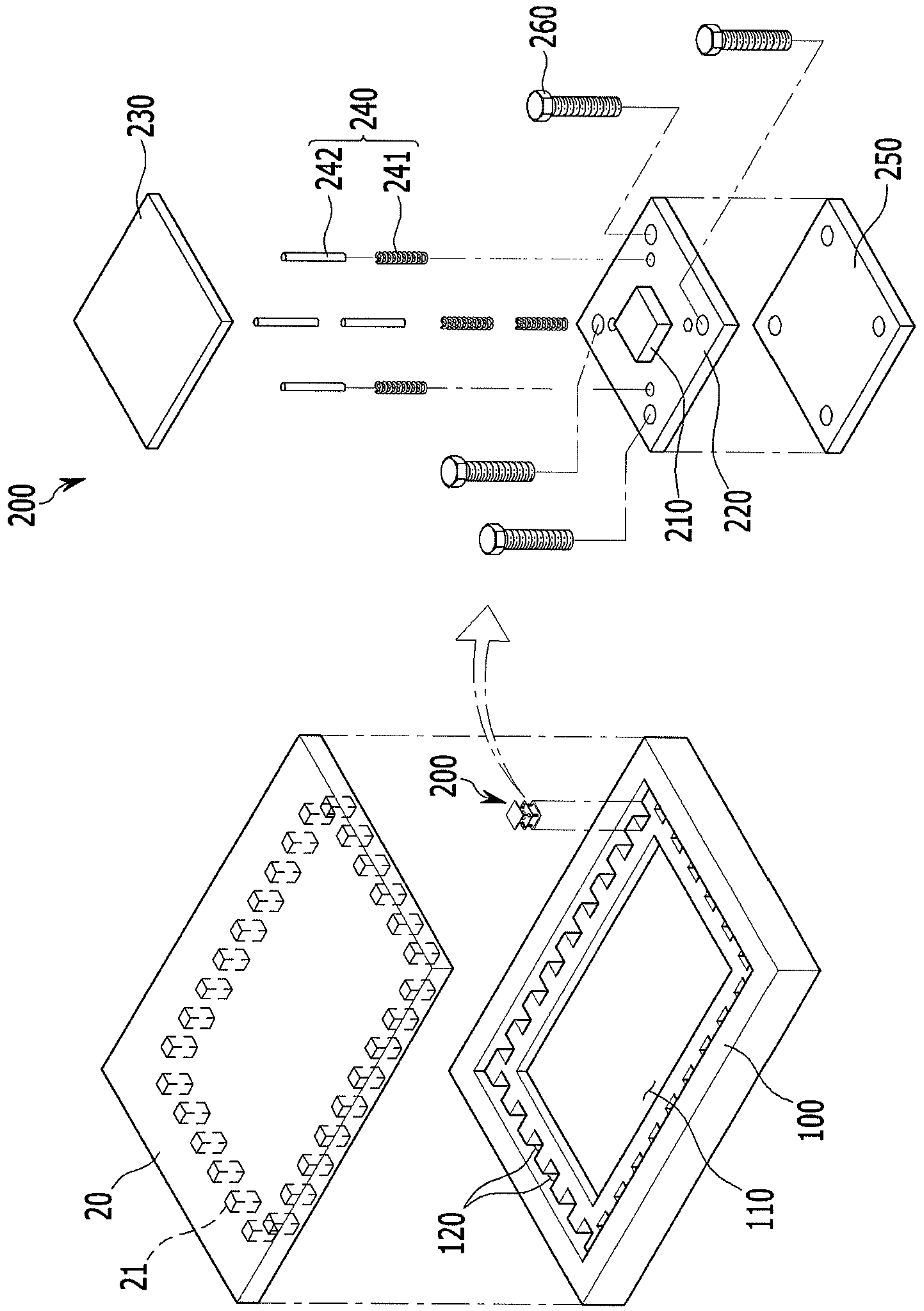
FIG. 1 illustrates an exploded perspective view of a flatness measurement device according to an exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of features may be exaggerated for clarity of illustration. Like reference numerals refer to like elements throughout.

In the described technology, the word "on" means positioning on or below the object portion, but does not essentially mean positioning on the upper side of the object portion based on a gravitational direction.

In the described technology, the term, "plate" refers to a flat-shaped member formed with various shapes using various materials. A cooling plate that may be provided in a thin film deposition device to cool a substrate to prevent deformation of the substrate during a deposition process of a thin film, such as, for example, during manufacturing of a semiconductor or a display, will be described as an example of the plate.

Hereinafter, a device for measuring flatness of a plate according to an exemplary embodiment will be described with reference to FIG. 1 to FIG. 3.

Figure 2:
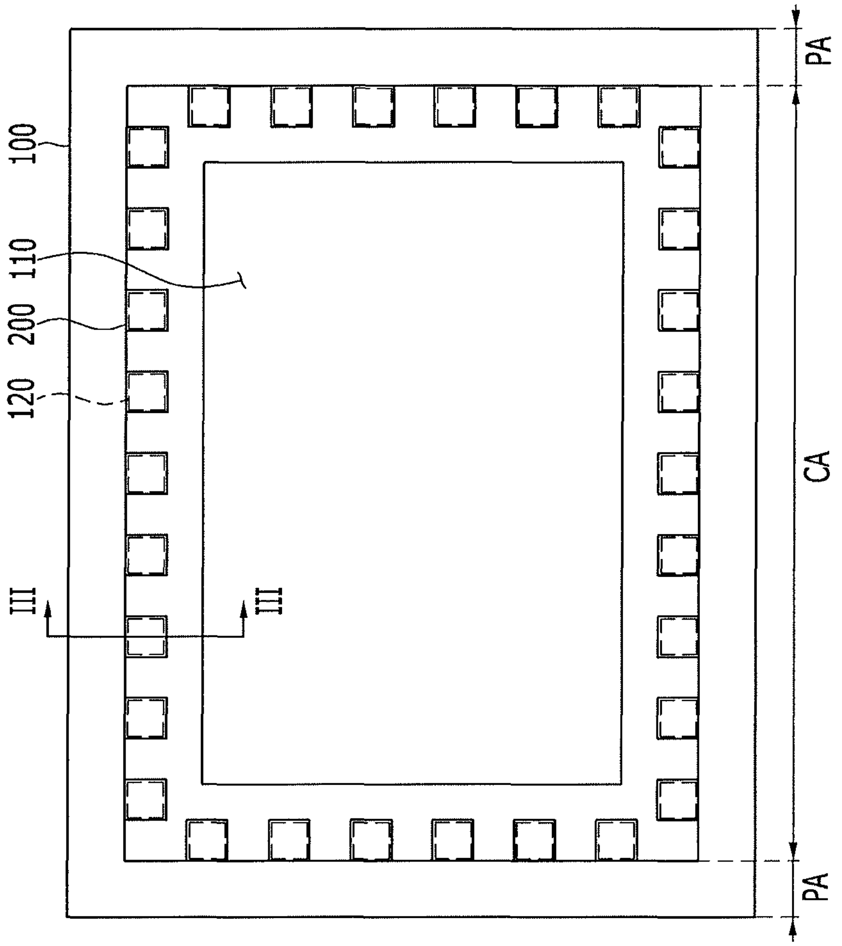
FIG. 2 illustrates a top plan view of the flatness measurement device according to the exemplary embodiment.
Figure 3:
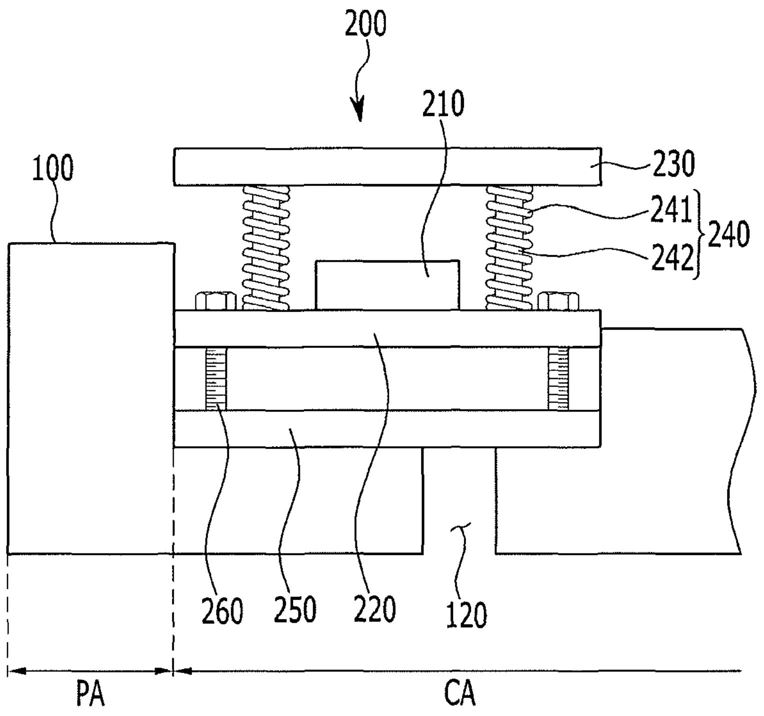
FIG. 3 illustrates a cross-sectional view of FIG. 2, taken along the line

FIG. 1 illustrates an exploded perspective view of the plate flatness measurement device according to the exemplary embodiment, FIG. 2 illustrates a cross-sectional view of the plate flatness measurement device according to the exemplary embodiment, and FIG. 3 illustrates a cross-sectional view of FIG. 2, taken along the line III-III.

In the exemplary embodiment, a plate 20 may be a cooling plate that may cool a substrate to prevent deformation of the substrate during a deposition process of a thin film, such as, for example, during manufacturing of a semiconductor or a display, and a metal that may not easily be deformed by having high conductivity and a low coefficient of thermal expansion. For example, the plate may be a metal plate made of a titanium alloy, a stainless alloy, or an invar alloy. The plate 20 may have a predetermined thickness to minimize deformation, for example, due to heat.

The plate 20 may need to be attached parallel with the upper surface of the substrate during the thin film deposition process, and therefore, the plate 20 may be installed in the thin film deposition apparatus in a manner in which a thickness direction of the plate 20 may equal a gravitational direction. Accordingly, the plate 20 that may be flat in the initial installation stage may be maintained to be flat, but the shape of the plate 20 may be deformed into a parabola that sags in a direction of gravity from the center, for example, due to the influence of gravity over time.

The plate 20 iteratively may contact the substrate during the thin film deposition process such that heat may be transferred from the heated substrate, and such an iterative heat change may cause formation of curves in the substrate surface.

Deformation may be expected, for example, due to the above-stated deformation factors, and two or more protrusions 21 may be formed in one surface of the plate 20 as shown in FIG. 1. The protrusions 21 may be provided with the same height such that they may become references for measuring flatness of the plate 20. The protrusions 21 may be arranged in a shape that surrounds the center of the plate 20, and the protrusions 21 in particular may be located at the outside of an area where the substrate and the plate 20 contact each other so as not to interrupt a unique function of the cooling plate.

In the plate flatness measurement device 10 according to the exemplary embodiment, the plate 20 may be arranged and mounted in a manner that the protrusions 21 may be formed on the bottom surface thereof, such that the degree of flatness of the plate 20 may be measured.

The plate flatness measurement device 10 may include a support frame 100 supporting a lower surface of the plate 20 mounted thereto and a sensor module 200 measuring a degree of flatness of the plate 20 through contact with the lower surface of the mounted plate 20 through at least a portion protruding upward from the support frame 100.

As shown in FIG. 1, the support frame 100 may support a lower portion of the plate 20. As shown in FIG. 2, the support frame 100 may be divided into a center area CA and a peripheral area PA surrounding the center area CA.

A through-hole 110 may be formed in the center area CA of the support frame 100 along a vertical direction of FIG. 1, and the height of the center area CA may be lower than the height of the peripheral area PA. Since the height of the support frame 100 is changed from the periphery to the center thereof, when the plate 20 is stereoscopically deformed, the plate 20 may be easily provided on the support frame 100.

For example, a general plate 20 may be formed in a shape with a center portion that is significantly curved, for example, due to gravity, and therefore, if no through-hole 110 is provided, the plate 20 may be unstably mounted to the upper portion of the support frame 100. Accordingly, the through-hole 110 may be formed to prevent the center portion of the plate 20 and the support frame 100 from contacting each other, such that portions excluding the center portion of the plate 20 may be evenly mounted to the support frame 100.

As shown in FIG. 1, in an embodiment, the support frame 100 and the through-hole 110 may be respectively quadrangular shaped and open-quadrangular shaped. The shape of the support frame 100 and the shape of the through-hole 110 may be changed according to, for example, the shape of a plate 20 to be measured, the number of protrusions 21, and alignment of the protrusions 21.

Insertion grooves 120 may be formed in the center area CA of the support frame 100, and the sensor module 200 that performs measurement of the flatness of the plate 20 may be inserted to the insertion grooves 120. As shown in FIG. 2, two or more insertion grooves 120 may be arranged to surround the through-hole 110, and the sensor module 200 may be inserted into each of the insertion grooves 120, or the sensor module 200 may be selectively inserted into one or more insertion grooves 120.

In the exemplary embodiment, the insertion grooves 120 may be disposed in the boundary of the center area CA that is adjacent to the peripheral area PA, as shown in FIG. 3, and the sensor module 200 may be inserted while partially protruding upward from the support frame 100. For example, as shown in FIG. 3, the height may gradually be decreased in the order of the sensor module 200, the peripheral area PA, and the center area CA. As described, steps between the sensor module 200 and the peripheral area PA and the center area CA may be set to be different from each other such that the plate 20 having a U-shaped cross-section that sags downward may easily contact the protruding sensor module 200 and at the same time may be mounted to the upper surface of the support frame 100.

Two or more sensor modules 200 according to the exemplary embodiment may be arranged along the periphery of the through-hole 110 on the center area CA. In the present exemplary embodiment, the sensor modules 200 may be arranged along the through-hole 110 corresponding to the quadrangular shape of the through-hole 110.

The sensor modules 200 may be selectively inserted into the insertion grooves 120. For example, an insertion groove 120 where no sensor module 200 may be inserted may exist, and the sensor modules 200 may be arranged corresponding to each other at opposite locations with reference to the through-hole 110.

In order to contact the protrusions 21 in the plate 20 mounted to the support frame 100, the sensor module 200 may include a sensor 210, a first plate 220, a contact plate 230, a vertical movement member 240, a second plate, and a gap control member 260, as shown in FIG. 1.

In the present exemplary embodiment, the sensor 210 may be a contact sensor that may sense contact between an upper portion of the sensor module 20 and the protrusion 21, or may be a displacement sensor that may measure displacement of the sensor module 200 through contact between the upper portion of the sensor module 200 and the protrusion 21 through physical attractive force, magnetic attractive force, electrostatic attractive force, light or ultrasonic wave reflection, or an eddy current signal rectification and analysis.

In the present exemplary embodiment, the displacement sensor may include one or more of an optical sensor, a contact sensor, a magnetic sensor, a capacitive sensor, an eddy current sensor, or an ultrasonic wave sensor, and the type of sensor 210 may be changed according to a measurement method of the sensor module 200.

The first plate 200 may support a lower portion of the sensor 210 such that the sensor 210 may be mounted thereto, and the contact plate 230 may be provided above the first plate 220 and may contact at least one of the protrusions 21 of the plate 20 mounted on the support frame 100. As shown in FIG. 1, the first plate 220 and the contact plate 230 may be coupled to each other through the vertical movement member 240, and when the contact plate 230 contacts the protrusion 21, the vertical movement member 240 may guide the contact plate 230 to be lowered toward the first plate 220 and the sensor 210.

The first plate 220 and the contact plate 230 may be spaced parallel to each other such that the sensor 210 may sense and calculate a distance between the first plate 220 and the contact plate 230 for convenience of measurement.

In the present exemplary embodiment, the vertical movement member 240 may include springs 241 provided at four corners of the first plate 220 that may trigger displacement of the contact plate 230 and shafts 242 that may guide a vertical movement direction of the springs 241.

As the vertical movement member 240 contacting the protrusion 21 may be elastically deformed, for example, due to weight of the plate 20, each spring 241 may trigger displacement of the contact plate 230, and the shafts 242 may pass through the respective springs 241 and then may vertically fasten the first plate 220 and the contact plate 230, such that the contact plate 230 may perform smooth vertical movement along a length direction of the shaft 242.

In an embodiment, the vertical movement member 240 of the exemplary embodiment may be formed with various constituent elements for triggering displacement from contact with the protrusion 21.

The second plate 250 may be provided below the first plate 220 and may support the weight of the first plate 220 and the contact plate 230. As shown in FIG. 3, the sensor module 200 may be provided in the support frame 100, and the second plate 250 may be provided above the insertion groove 120.

The gap control member 260 may combine, e.g., connect, the first plate 220 and the second plate 250 while controlling a vertical gap between the first plate 220 and the second plate 250. Thus, as shown in FIG. 3, the gap control member 260 may control the contact plate 240 to protrude above the support frame 100.

When the plate 20 is a body weight, the plate 20 may contact a part of the peripheral area PA according to a degree of protrusion of the sensor module 200, the weight of the plate 20 may be dispersed not only into the vertical movement member 240, but also into the support frame 100, and flatness may not be precisely measured. However, in the present exemplary embodiment, an initial location of the contact plate 230 may be controlled by controlling a vertical gap between the first plate 220 and the second plate 250, and flatness may be more precisely measured.

As shown in FIG. 2, two or more sensor modules 200 may be provided, the degree of protrusion of the contact plate 230 may be controlled using the gap control member 260 so as to make the two or more sensor modules 200 protrude by equal degrees above the support frame 100, and reference for measuring flatness may be easily controlled.

In the present exemplary embodiment, the bolts where screw threads may be formed may be used as the gap control members 260. In an embodiment, various structures such as a cylinder or a shaft-coupled spring may be used.

The following experimental examples are provided in order to highlight characteristics of one or more embodiments, but it will be understood that the experimental examples are not to be construed as limiting the scope of the embodiments. Further, it will be understood that the embodiments are not limited to the particular details described in the experimental examples.

Hereinafter, referring to FIG. 4 and FIG. 5, a result of a precision measurement of the sensor module will be described as an experimental example of the plate flatness measurement device according to the exemplary embodiment.

Figure 4:
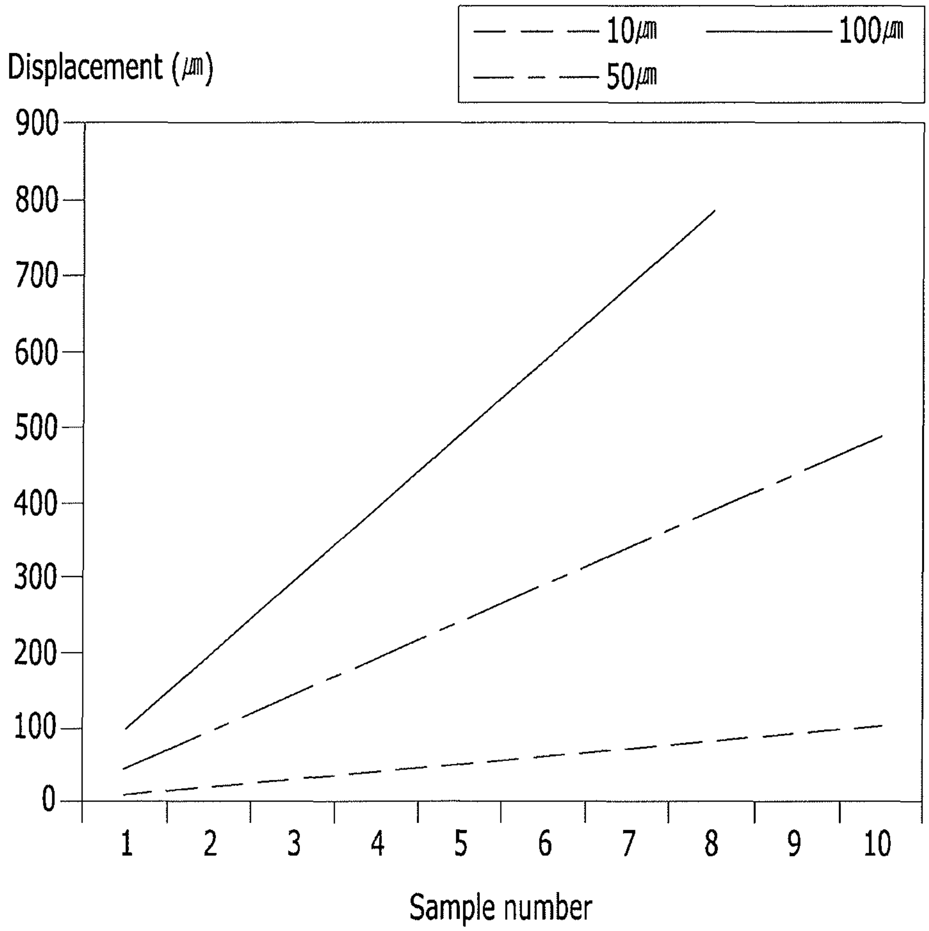
FIG. 4 and FIG. 5 illustrate graphs of an evaluation of an error of the sensor modules of the plate flatness measurement device according to the exemplary embodiment, with FIG. 4 illustrating a result of an evaluation of an error when the sensor modules are lifted and FIG. 5 illustrating a result of an evaluation of an error when the sensor modules are lowered.
Figure 5:
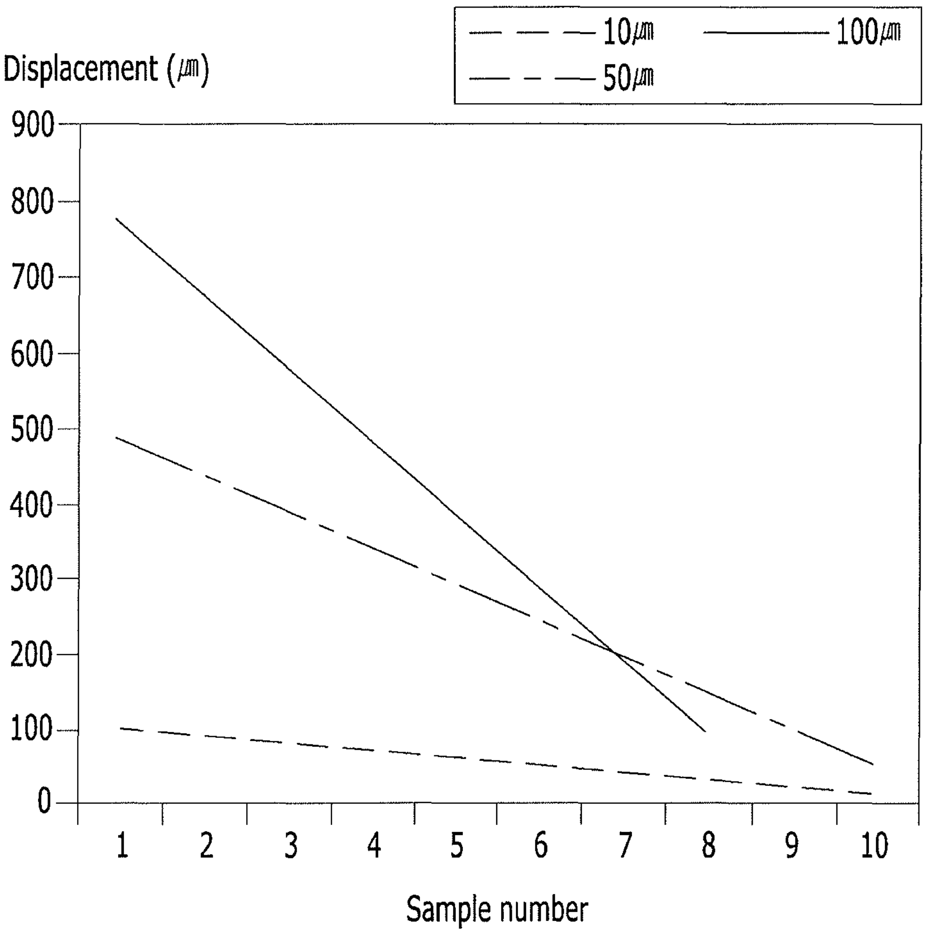

FIG. 4 and FIG. 5 illustrate graphs of the evaluation of an error of the sensor modules of the plate flatness measurement device according to the exemplary embodiment, with FIG. 4 specifically illustrating a result of evaluation of an error when the sensor modules are lifted and FIG. 5 illustrating a result of evaluation of an error when the sensor modules are lowered.

In the present experimental example, a capacitive displacement sensor was used as the sensor 210 of the sensor module 200, aluminum plates were used as the first and second plates 250, a titanium plate was used as the contact plate 230, and stainless steel members were used as the shaft 242 and the gas control member 260.

The sensor module 200 was fastened to a micrometer, and then the contact plate 230 was lifted (FIG. 4) or lowered (FIG. 5) with a gap of 10 μm, 50 μm, and 100 μm within a measurement range of 0 μm to 2,000 μm, and the results were measured.

Table 1 and FIG. 4 show a result of gradual lifting of the contact plate 230.

TABLE 1

| Number of | Gap control amount (μm) | | | Difference (μm) | | |
|---|---|---|---|---|---|---|
| lifts | 10 μm | 50 μm | 100 μm | 10 μm | 50 μm | 100 μm |
| 1 | 9.2 | 48.7 | 96.8 | — | — | — |
| 2 | 19.2 | 96.6 | 194 | 10.0 | 47.9 | 97.2 |
| 3 | 29.7 | 144.1 | 293.4 | 10.5 | 47.5 | 99.4 |
| 4 | 40.7 | 192.1 | 391 | 11.0 | 48.0 | 97.6 |
| 5 | 49.6 | 239.7 | 491 | 8.9 | 47.6 | 100 |
| 6 | 59.8 | 287.9 | 591 | 10.2 | 48.2 | 100 |
| 7 | 69.6 | 336.6 | 689 | 9.8 | 48.7 | 98 |
| 8 | 79.5 | 386.7 | 791 | 9.9 | 50.1 | 102 |
| 9 | 89.5 | 435.5 | — | 10.0 | 48.8 | — |
| 10 | 98.8 | 484.5 | — | 9.3 | 49 | — |

According to Table 1, the contact plate 230 was gradually lifted with gaps of 10 μm, 50 μm, and 100 μm, respectively, and each section showed an allowable error range in the result of the experiment. The results show that the respective slopes are linear graphs that extend obliquely in a constant upper right direction.

The contact plate 230 was gradually lowered, and the results of the experiment are shown in Table 2 and FIG. 5.

TABLE 2

| Number of | Gap control amount difference (μm) | | | Difference (μm) | | |
|---|---|---|---|---|---|---|
| lowers | 10 μm | 50 μm | 100 μm | 10 μm | 50 μm | 100 μm |
| 1 | 97.6 | 487.9 | 780.1 | — | — | — |
| 2 | 87.4 | 438.6 | 681.7 | 10.2 | 49.3 | 98.4 |
| 3 | 77.7 | 389.0 | 586.5 | 9.7 | 49.6 | 95.2 |
| 4 | 68.2 | 342.7 | 489.5 | 9.5 | 46.3 | 97 |
| 5 | 58.8 | 293.8 | 393.4 | 9.4 | 48.9 | 96.1 |
| 6 | 49.7 | 243.0 | 292.9 | 9.1 | 50.8 | 100.5 |
| 7 | 40.0 | 195.5 | 193.8 | 9.7 | 47.5 | 99.1 |

TABLE 2-continued

| Number of | Gap control amount difference (μm) | | | Difference (μm) | | |
|---|---|---|---|---|---|---|
| lowers | 10 μm | 50 μm | 100 μm | 10 μm | 50 μm | 100 μm |
| 8 | 29.5 | 145.7 | 97.1 | 10.5 | 49.8 | 96.7 |
| 9 | 19.6 | 96.6 | — | 9.9 | 49.1 | — |
| 10 | 9.2 | 47.8 | — | 10.4 | 48.8 | — |

According to Table 2, the contact plate 230 was gradually lowered with gaps of 10 μm, 50 μm, and 100 μm, respectively, and each section showed an allowable error range in the result of the experiment. The results showed that the respective slopes are linear graphs that extend obliquely in a constant lower right direction.

Hereinafter, referring to FIG. 6 to FIG. 8, a plate flatness measuring method using the plate flatness measurement device according to the exemplary embodiment will be described. In the description of the plate flatness measuring method, the detailed description of the plate flatness measurement device will be omitted.

Figure 6:
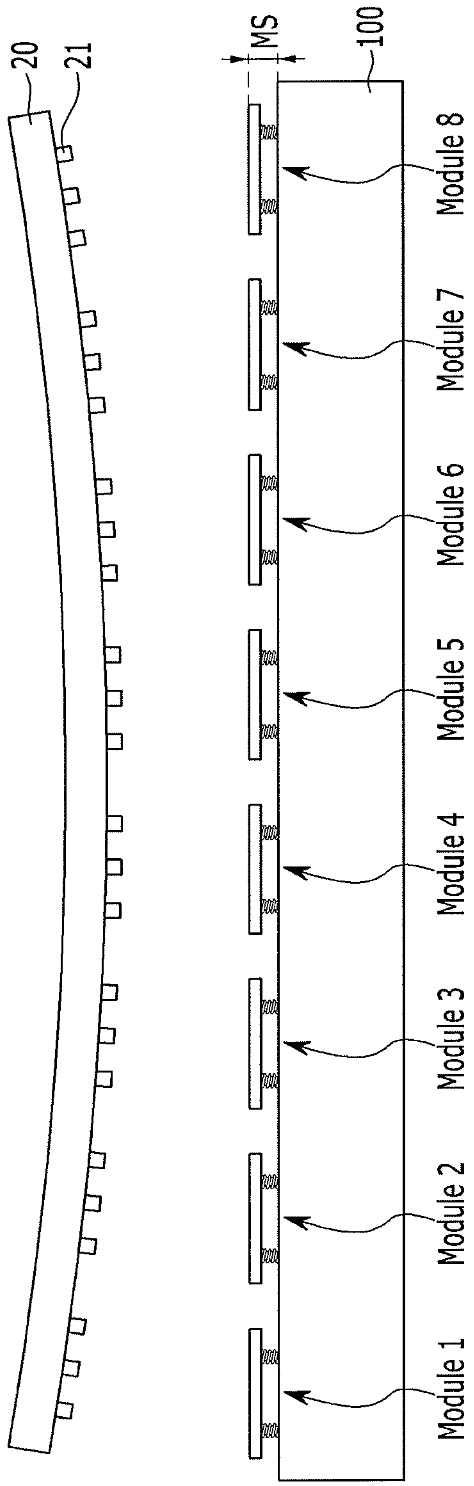
FIG. 6 illustrates a state in which a measurement standard of the flatness measurement device according to the exemplary embodiment is set.
Figure 7:
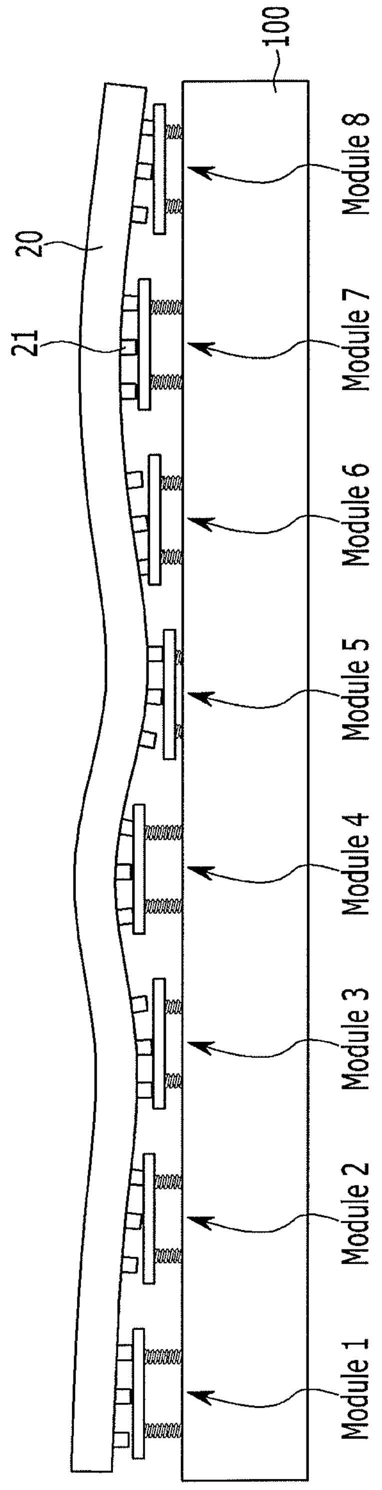
FIG. 7 illustrates a state in which a plate is mounted to the flatness measurement device according to the exemplary embodiment.
Figure 8:
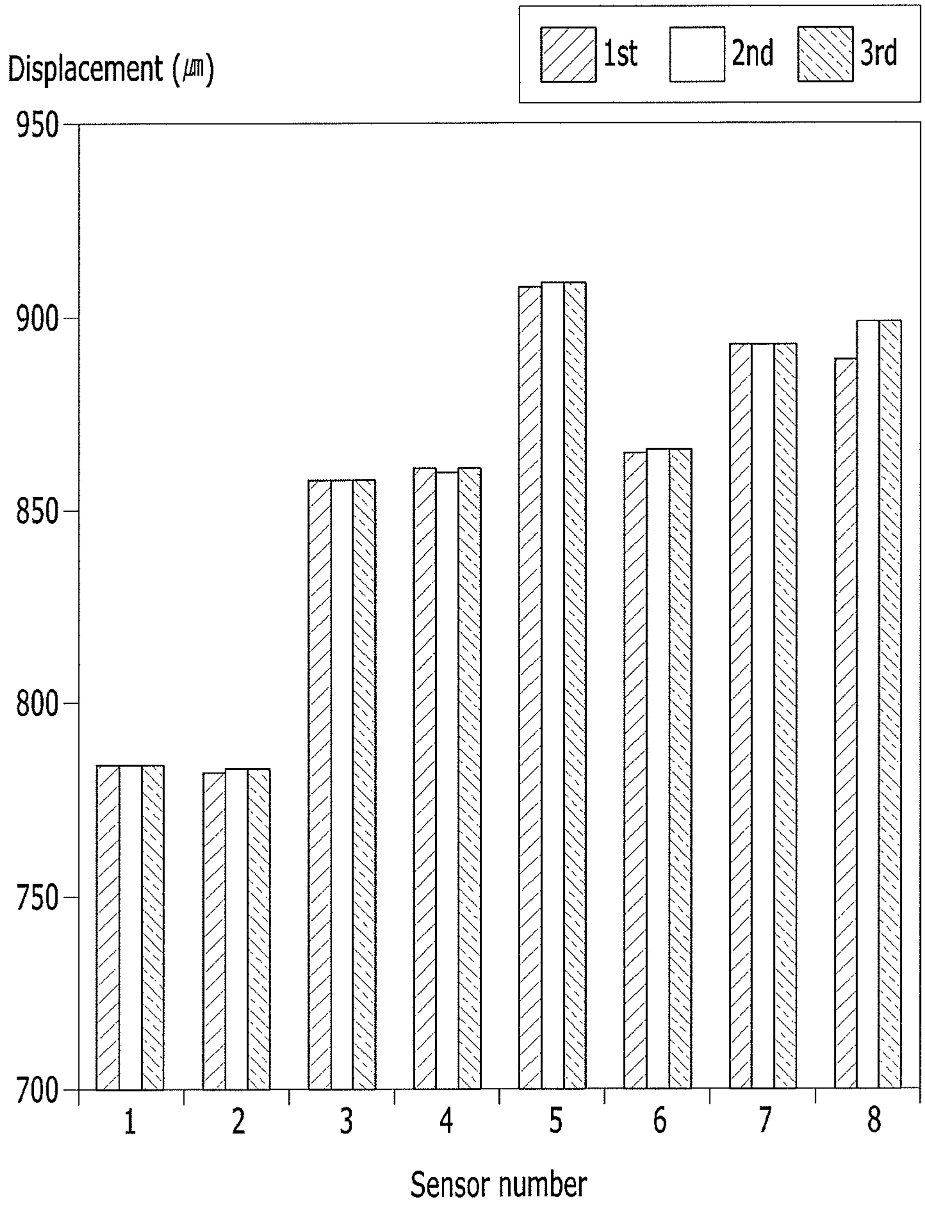
FIG. 8 illustrates a result of three performances of the flatness measurement of FIG. 7.

FIG. 6 illustrates a state in which a measurement standard of the plate flatness measurement device according to the exemplary embodiment is set, FIG. 7 illustrates a state in which the plate is mounted to the plate flatness measurement device according to the exemplary embodiment, and FIG. 8 illustrates a result of three flatness measurements of FIG. 7.

The plate flatness measuring method according to the exemplary embodiment may include: preparing the plate 20; setting a measurement standard of the sensor module 200; mounting the plate 20 to the support frame 100; and measuring the degree of flatness of the mounted plate 20.

In the preparation of the plate 20, the plate 20 in which two or more protrusions 21 may be formed in a bottom surface thereof may be prepared. In the present exemplary embodiment, as shown in FIG. 6, a partially deformed plate 20 may be prepared. The deformed shape of the plate 20 may have a U-shape as shown in FIG. 6. In an embodiment, the plate 20 may be deformed to have two or more curved portions in the surface thereof, for example, due to continuous curves, as shown in FIG. 7.

In setting the measurement standard, first, as shown in FIG. 6, protruding lengths of first to eighth sensor modules, module 1 to module 8, provided in the support frame 100 may respectively be controlled using the above-stated vertical movement member 240, such that the first to eighth sensor modules, module 1 to module 8, may protrude at the same height from the support frame 100. The controlled protruding lengths of the first to eighth sensor modules, module 1 to module 8, may be set to a measurement standard (MS).

In the plate mounting, as shown in FIG. 7, the plate 20 may be lowered toward the support frame 100 so that the protrusions 21 respectively contact the first to eighth sensor modules, module 1 to module 8. A contact plate area of each sensor module may be wider than each protrusion 21, and one contact plate may contact a plurality of neighboring protrusions. As shown in FIG. 7, each sensor module may contact protrusions that sag the most among the plurality of neighboring protrusions.

In the flatness measurement, as shown in FIG. 7, displacement of each of the first to eighth sensor modules, module 1 to module 8, may be measured compared to the measurement standard MS so that flatness of contact areas between the plate 20 and the first to eighth sensor modules, module 1 to module 8, may be schematically calculated.

For example, a predetermined number of sensor modules may be disposed at a constant distance from each other and an amount of deformation of the most significantly deformed protrusions among neighboring protrusions of corresponding locations may be measured such that the degree of deformation of the plate 20 may be easily determined without arranging sensor modules for all of the protrusions.

Results of three flatness measurements of plate 20 of FIG. 7 are shown in Table 3 and FIG. 8.

TABLE 3

| Sensor | Displacement (μm) | | |
|---|---|---|---|
| module | First time | Second time | Third time |
| 1 | 784 | 784 | 784 |
| 2 | 782 | 783 | 783 |
| 3 | 858 | 858 | 858 |
| 4 | 861 | 860 | 861 |
| 5 | 908 | 909 | 909 |
| 6 | 865 | 866 | 866 |
| 7 | 893 | 893 | 893 |
| 8 | 889 | 899 | 899 |

Referring to Table 3 and FIG. 8, displacement of the respective sensor modules occurred uniformly, except for a predetermined error in the eighth sensor module. As described, displacement of each location of the plate 20 due to contact with each sensor module was measured such that the degree of deformation of the corresponding plate 20 may be schematically determined.

In Table 3 and FIG. 8, eight total sensor modules were arranged for each section as an experimental example, but if the sensor modules are more densely arranged such that one protrusion 21 corresponds to one sensor module 200, the degree of flatness of the plate 20 may be more precisely calculated.

As described, according to the plate flatness measurement device and the measuring method thereof according to the exemplary embodiment, a plurality of sensor modules 200 contacting protrusions provided in the bottom surface of the plate 20 may be arranged to measure displacement of sensor modules 200 of each section compared to the measurement standard (MS), and the degree of flatness of the plate 20 may be measured without using a complex measurement and analysis.

By way of summation and review, a mask and the substrate exposed to a relatively high-temperature organic material steam for a long period of time during an organic thin film deposition process may be deformed, for example, due to heat, and the mask and the substrate may be separated from each other.

If the deposition process is performed while the mask and the substrate are separated from each other, the thin film deposition pattern may be formed with an irregular shape or be formed larger than a slit in the mask rather than the same shape as the slit.

As described, in order to avoid or reduce the likelihood of separation of the mask and the substrate during the deposition process, a cooling plate may be provided above the substrate to eliminate the heat, and the substrate may be pressed toward the mask during the deposition process to minimize thermal deformation of the mask and the substrate.

However, when the substrate is pressed using the cooling plate, the center portion of the cooling plate provided above the substrate may become looser in a direction of gravity than edge portions due to gravity. In order to reduce deposition failure, for example, due to sagging of the cooling plate, a means of measuring the degree of flatness of the cooling plate may be needed.

The described technology relates to a device measuring flatness of a cooling plate mounted to devices such as, for example, an etching device or a deposition device, which may be used throughout the electronics industry, such as, for example, during manufacturing of a semiconductor or a display.

Provided is a cooling plate flatness measurement device that may measure the degree of flatness of a cooling plate to sense sagging of the cooling plate in advance, and deposition failure may be prevented in advance.

In the plate flatness measurement device according to the exemplary embodiment, a plurality of sensor modules contacting protrusions provided in the bottom surface of the plate may be arranged to measure displacement of sensor modules of each section compared to the measurement standard, and the degree of flatness of the plate may be measured without using a complex measurement and analysis.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A plate flatness measurement device, comprising:

a support frame including a center area, the center area including a through-hole in a center of the center area, and a peripheral area surrounding the center area, the peripheral area having a plate with protrusions on a bottom surface of the plate mounted to the peripheral area; and a sensor module in the support frame, the sensor module at least partially protruding above the support frame to contact the protrusions.

2. The plate flatness measurement device as claimed in claim 1, wherein two or more sensor modules are along a periphery of the through-hole in the center area.

3. The plate flatness measurement device as claimed in claim 1, wherein a height of the center area is lower than a height of the peripheral area.

4. The plate flatness measurement device as claimed in claim 1, wherein the support frame includes an insertion groove in the center area and in which the sensor module is inserted.

5. The plate flatness measurement device as claimed in claim 4, wherein two or more insertion grooves surround the through-hole.

6. The plate flatness measurement device as claimed in claim 4, wherein the through-hole has a quadrangular-shaped cross-section.

7. The plate flatness measurement device as claimed in claim 1, wherein the sensor module includes:

a sensor;

a first plate on which the sensor is mounted;

a contact plate above the first plate, the contact plate contacting at least one protrusion; and a vertical movement member combining the first plate and the contact plate to make the contact plate vertically movable.

8. The plate flatness measurement device as claimed in claim 7, wherein the sensor module further includes:

a second plate below the first plate; and a gap control member combining the first plate and the second plate with a controllable gap between the first plate and the second plate.

9. The plate flatness measurement device as claimed in claim 7, wherein the contact plate has a cross-section area that is greater than a cross-section area of the protrusion.

10. The plate flatness measurement device as claimed in claim 7, wherein the sensor is a displacement sensor including one or more of an optical sensor, a contact sensor, a magnetic sensor, a capacitive sensor, an eddy current sensor, or an ultrasonic wave sensor.

11. The plate flatness measurement device as claimed in claim 1, wherein two or more sensor modules correspond to each other at opposite locations with reference to the through-hole.

* * * * *